United States Patent

Fiedler et al.

[11] Patent Number: 5,852,246
[45] Date of Patent: Dec. 22, 1998

[54] PROCESS FOR THE ADAPTIVE ACTUAL-VALUE CORRECTION IN FATIGUE STRENGTH TESTS

[75] Inventors: Bernhard Fiedler, Munich; Dieter Schütz, Reinheim, both of Germany

[73] Assignee: Bayerische Motoren Werke Aktiengesellschaft, Muenchen, Germany

[21] Appl. No.: 892,173

[22] Filed: Jul. 14, 1997

[30] Foreign Application Priority Data

Jul. 12, 1996 [DE] Germany ................ 196 28 100.8

[51] Int. Cl.$^6$ ........................................................ G01N 3/32
[52] U.S. Cl. ........................................ 73/811; 73/808
[58] Field of Search ..................... 73/808, 811, 799, 73/797, 821

[56] References Cited

U.S. PATENT DOCUMENTS

| | | |
|---|---|---|
| 3,345,864 | 10/1967 | Painter et al. . |
| 3,733,895 | 5/1973 | Ishida ................................. 73/797 |
| 4,590,804 | 5/1986 | Brull ................................... 73/799 |
| 4,672,190 | 6/1987 | Rostkowski et al. . |
| 4,691,576 | 9/1987 | Schleuniger et al. ............... 73/821 |
| 5,012,428 | 4/1991 | Ueno et al. . |
| 5,299,459 | 4/1994 | Underwood . |
| 5,511,431 | 4/1996 | Hinton ................................ 73/806 |

OTHER PUBLICATIONS

Klinger, Friedrich: "Digitale Regelung von Mehr–komponenten–Betriebsfestigkeitsprüständer für die Automobilindustrie", ATZ Automobiletechnische Zeitschrift, 1980, pp. 469–474.
Search Report, Jan. 2, 1997, Germany.

*Primary Examiner*—Max H. Noori
*Attorney, Agent, or Firm*—Evenson, McKeown, Edwards & Lenahan, P.L.L.C.

[57] ABSTRACT

A process is provided for the adaptive actual-value correction during fatigue strength tests in which a deviation of the actual value from the desired value is determined and by means of a change of the desired-value indication to a desired correction value, the actual value can be controlled in the direction of the real desired value. To minimize problems with errors and test time length, signals which correspond to the desired value and the actual value are separated into in each case at least one individual event which are each defined by two reversal points and are described by (i) a first load measurement in the first reversal point, (ii) a second load measurement in the second reversal point, (iii) a time interval between the reversal points and the points in time of the reversal points, and (iv) characteristic form of the connection curve between the two reversal points, or a comparison is made of the individual events of the desired values and the actual values, the new desired correction values are formed which are then used for the control instead of the previous desired values, in the next return period.

19 Claims, 2 Drawing Sheets

PROCESS FOR THE ADAPTIVE ACTUAL-VALUE CORRECTION IN FATIGUE STRENGTH TESTS

BACKGROUND AND SUMMARY OF THE INVENTION

The invention relates to a process for the adaptive actual-value correction in fatigue strength tests in which a deviation of the actual value from the desired value is determined and by means of a change of the desired-value indication to a desired correction value, the actual value can be controlled in the direction of the real desired value.

During the test bench simulation of stresses to a construction, it is an object to reflect the stresses occurring in the real operation on the test bench as close to reality as possible. The possibility of indicating this stress as close to reality as possible depends on many factors which are determined by the part to be tested, the structure of the test and the performance characteristics of the components generating the load with the pertaining control circuits. The quality of a stress simulation is, among others, described by the deviation of the achieved loads (actual value) from the desired, provided loads (desired value).

FIG. 1 illustrates the course of a load over time (load-time function) as a desired value and the course of the load actually generated by a test bench as an actual value. Typical deviations of the actual values from the desired value are an exceeding of the load or a falling below the load and time-related shifts. With respect to their point of concentration, these deviations are considered only in the reversal points of the load because the reversals are the parameters of a load-time function which are most important for the fatigue strength.

In principle, a differentiation is to be made between fatigue strength tests with one or several load components which affect the tested part simultaneously.

It is a problem that, as the result of the deviation of the actual value from the desired value, the result of a fatigue strength test can be falsified. Such deviations should be avoided.

There are basically several different approaches for avoiding deviations between the desired value and the actual value. For tests with only one load component, preferably matrix-oriented processes are used.

In contrast, for tests with several load components, processes are used which by way of transfer functions to be determined experimentally, to calculate a new "distorted" desired-value time function. Generally, this takes place by iterative learning steps which with respect to time take place before the actual fatigue strength test.

The above-mentioned matrix-oriented process is typically not suitable for correcting the load-time histories for tests with several load components because, for this purpose, explicitly different frequencies and curve shapes also for so-called half-load cycles—that is the range between two reversal points—must be taken into account.

For such tests, complicated processes with experimentally determined, frequency-dependent transfer functions have been successful. However, generally these processes offer no possibility of automatically (adaptively) taking into account changes occurring in all tests during the running time.

It is therefore an object of the invention to further develop a process of the initially mentioned type such that the errors between a desired value and the actual value are automatically corrected and the whole capacity of the corresponding control circuit can be optimally utilized while maintaining the time (phase) correlation of the individual force channels.

This object is achieved according to preferred embodiments of the invention by providing a process wherein signals which correspond to the desired value and the actual value are separated into in each case at least one individual event which are each defined by two reversal points and are described by a first load measurement in the first reversal point, a second load measurement in the second reversal point, a time interval between the reversal points or the points in time of the reversal points, and a form of the connection curve between the two reversal points, and wherein a comparison of the mutually corresponding individual events of the desired values and the actual values is made to form new desired correction values which are then used for the control instead of the previous desired values in the next return period.

Accordingly, in the case of a process of the initially mentioned type, signals assigned to the desired value and the actual value are separated into in each case at least one individual event which are defined by two reversal points and are described by a first load measurement in the first reversal point, a second load measurement in the second reversal point, a time interval between the reversal points or the points in time of the reversal points and a form of the connection curve between the two reversal points. The mutually corresponding individual events of desired and actual values are compared with one another and the new desired correction value is formed from the deviations and is used for the further control of the test device in the next return period.

The deviations of the actual value are always related to the intended desired value and not to the desired correction value which is used only for controlling the test device. The intended or actual desired value can, for example, be determined experimentally.

Other objects, advantages and novel features of the present invention will become apparent from the following detailed description of the invention when considered in conjunction with the accompanying drawings.

DETAILED DESCRIPTION OF THE DRAWINGS

Figure 1:
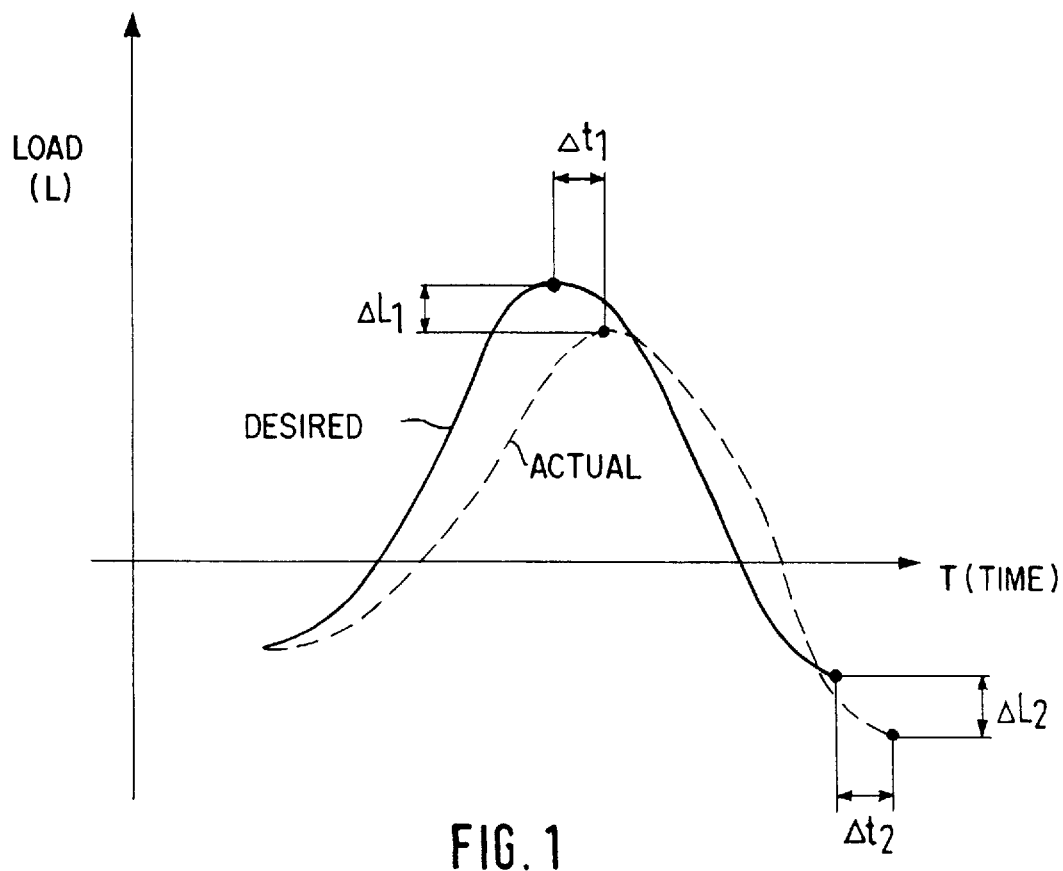
FIG. 1 is a representation of a load-time diagram which shows the deviations between the desired value and the actual value.

Load or stress is also, for example, the path, the tension, the force, the expansion, the moment, etc. It is important that this quantity in the desired value and the actual value is described by an electric quantity in a digital or analog form.

A decisive point of the present process is the definition of individual events between two reversal points according to load measurement, time classification and connection curve. These individual events are half-load cycles, that is, transitions between two adjacent reversal points.

Each time signal can be described as a sequence of separable individual events. Under these conditions, a matrix or a special arrangement of values can be established for storing information which indicates how far the actual value for each individual event deviates from the intended or desired value.

From this matrix (error matrix), a correction matrix can be derived which indicates for each individual event (half-load cycle), a specific correction for the desired value. The goal is to change the desired value to a desired correction value such that, as the result of the control of a test device by means of the determined desired correction value, the actual value, if possible, corresponds to the intended and actual desired value. The limits of the process have been reached when the individual events can no longer be defined, for example, because they have different characteristics, for example, with respect to the frequency or the form of the signal course between the reversal points.

For the tests, for example, with several load components, for the description of the removed half-load cycles, thus of the individual events, the values of the adjacent reversal points, their time interval and the function (curve form) by means of which the two reversal points are connected, must be known. In addition, the phase relation must also be taken into account and maintained between the individual load components and their signals.

An important idea of the present process is therefore the dividing of the transient signal of the individual channels into respective individual events for tests with several load components.

The transient desired-value time functions are separated into individual events whose data are then stored in so-called "desired-value files" in a chronologically correct sequence. This must take place for each individual channel, in which case the phase relation of the individual channels with respect to one another is ensured by a time date. In addition, it must be taken into account for the phase relation that the point in time at which the second reversal point of the individual event occurs is related to a time axis. For this purpose, a master channel is typically defined for a load component, specifically that channel or that load component which has the fewest test-related reserves and thus can no longer be accelerated. The other channels are so-called "slave channels". The criterion for the selection of the master channel are the largest time-related shifts between the desired value and the actual value.

Figure 2:
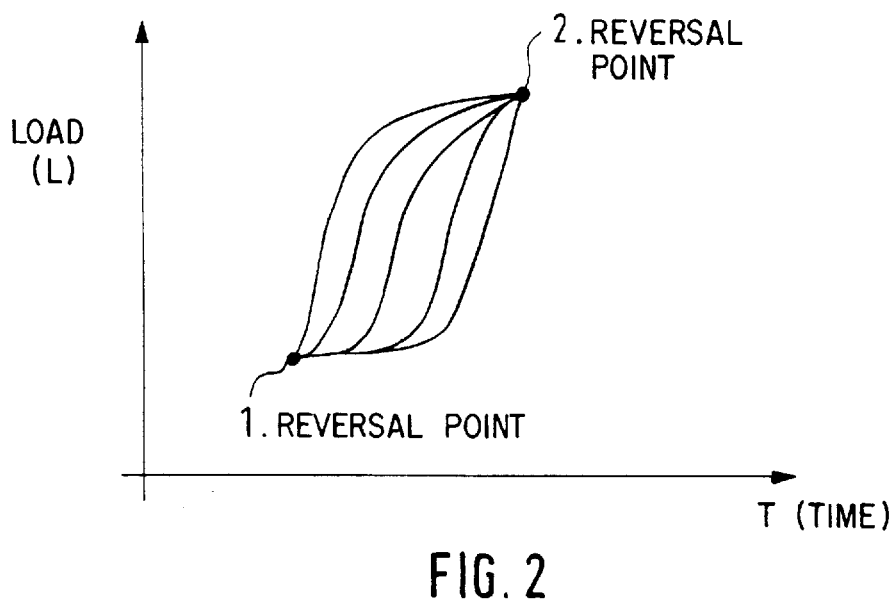
FIG. 2 is a representation of a load-time diagram in which different curve forms are shown between two reversal points of an event.

The load reversal points and the time period Δt situated in between are described by concrete numerical values. The curve form, in contrast, is categorized in several classes and is also described by a numerical value in the file structure. The curve categorizing takes place in a selectable detail, as illustrated. for example, in FIG. 2, in which two reversal points are connected by various curve forms. One of these curve forms is closest to a predefined curve form (measured desired value).

The discrete values of the curve forms are filed centrally in the memory, separately from the file describing the desired value sequence.

In principle, it is naturally also possible to describe the curve form for each individual event completely mathematically (for example, in the form of so-called splines) and to file it in the file per half-load cycle. A combination of the two curve form descriptions in one and the same file is also possible.

The desired value is transmitted as an analog or digital desired-value signal to an electronic control system. This takes place by the time synchronized (according to the phase) for all channels of a test system with several load components. The actual values of each load component measured on the test device are also separated into individual events, and then the data are determined which correspond to the individual events.

Subsequently, the mutually corresponding parameters (desired value and actual value), specifically the load value of the second reversal point (the load value of the first reversal point had been processed as the load value of the second reversal point in the preceding half-load cycle (individual event)), the time interval Δt and the category of the curve form of both mutually corresponding individual events can be compared. Corresponding to the deviation, a correction of the desired value can take place to a (new) desired correction value. The newly found desired correction values are filed in parallel to the original desired value file as a corrected desired value file. This corrected desired value file is used for the emission of the next partial sequence (repetition period).

In this manner, the desired value file is (adaptively) corrected once per repetition period. In this case, it must naturally be taken into account that, for the desired-value actual-value comparison and the resulting correction values, in each case the current actual value must be compared with the original (thus actually measured) desired value of the first repetition period. The strategy for the correction of errors which follows the desired-value actual-value comparison can be adapted by the user in wide ranges to the demands of the respective test problem.

If the actual value has a strong distortion with respect to the desired value curve, a third form of the description of the curve form may be useful. An arbitrary number of support points between the extremes are filed in addition with their time-related occurrence. In most cases, one, two or three may be sufficient. Also at the point in time of the occurrence of these support points, the desired value and the actual value are compared and a correction of the desired value in the described form is to be made as required in order to achieve the correct curve form corresponding to the real desired value in the case of the actual value.

Figure 3:
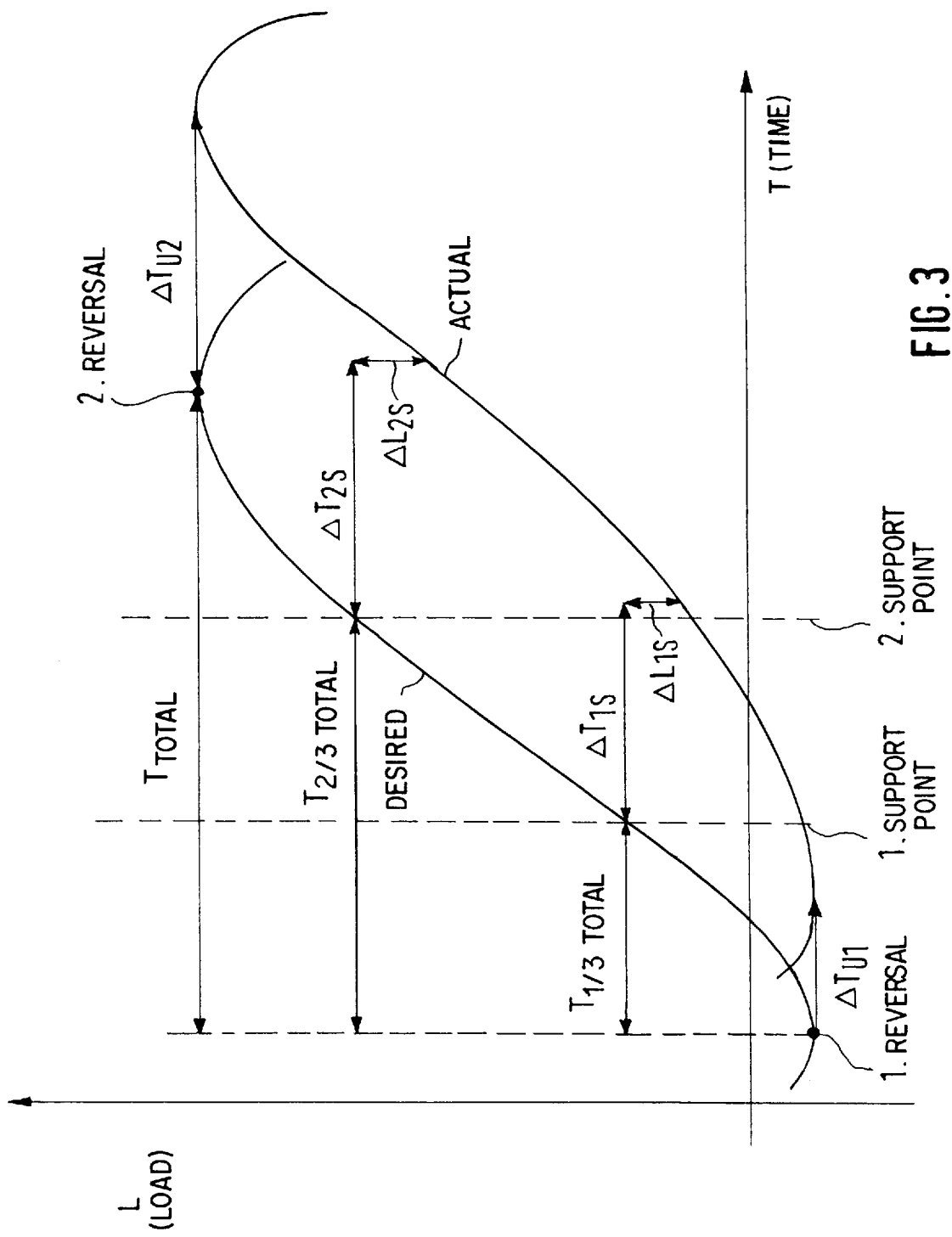
FIG. 3 is a representation of a load-time diagram in which the function is shown of support points for determining the deviation between the desired value and the actual value.

FIG. 3 illustrates an adaptive curve form adaptation with two support points in which case, in the load-time diagram, one curve represents the desired value curve and the other curve represents the actual value curve which is shifted thereto. Basically, when the support points are used, the time offset between the desired value and the actual value must be taken into account. The time offset can be read at the reversal points ($\Delta T_{U1}$, $\Delta T_{U2}$). According to FIG. 3, in the case of both support points, between the two reversal points of the considered half cycle, the total time between the reversal points $t_{total}$ is divided into thirds.

In the desired value, the first support point therefore occurs after a third of the time ($\frac{1}{3} T_{total}$) between the reversal points, and the second support point occurs after $\frac{2}{3}$ of this time ($\frac{2}{3} T_{total}$) in the desired value.

The actual value is shifted with respect to this time, specifically in the example at the first reversal point by $\Delta T_{U1}$ and, at the second reversal point by $\Delta T_{U2}$. In this case, $\Delta T_{U1}$ and $\Delta T_{U2}$ may definitely have different values.

The comparison of the desired value and the actual value at a support point must therefore be carried out with the following time shift $T_{support\ point}$ ($\Delta T_{1S}$, $\Delta T_{2S}$):

Concerning the example at the first support point $$\Delta T_{1S} = \Delta T_{U1} + \frac{(\Delta T_{U2} - \Delta T_{U1})}{3} = 2/3\, \Delta T_{U1} + 1/3\, \Delta T_{U2}$$

or at the second support point $$\Delta T_{2S} = \Delta T_{U1} + \frac{2 \cdot (\Delta T_{U2} - \Delta T_{U1})}{3} = 1/3\, \Delta T_{U1} + 2/3\, \Delta T_{U2}$$

The factors result from the averaging of the time shift at the first and the second reversal point. If, at these points in time, the actual value is, for example, lower than the desired value ($\Delta L_{1S}$, $\Delta L_{2S}$), it is corrected in the next repetition period. in that the curve of the desired value at the first support point is raised by a corresponding amount.

Although the described process has the disadvantage that the corrections on the individual event half-load cycle can be carried out only once per repetition period, this represents no significant limitation in a test with a high repetition frequency of the repetition periods.

Under favorable marginal conditions, it is conceivable that the correction values, instead as described above, are not taken from a file of the sequential individual events (file-oriented correction) but from a multi-dimensional correction matrix. The different correction values stored in this multi-dimensional matrix must take into account the following parameters:

Reversal point parameter, time interval $\Delta t$, category of the curve form and kinematic crosstalk behavior of the various load components.

Each parameter forms a dimension of the multi-dimensional matrix.

The experimental practice has shown that individual parameters frequently remain constant in special cases and therefore do not have to be taken into account when the correction matrix is considered.

For example, the same curve forms may occur, or a large number of the load cycles may take place in a cosine form. In addition, an identical kinematic crossover behavior is possible in the case of single individual events. This is typical when no significant paths occur in the case of several load components.

In these cases, in addition to the matrix of the reversal points, only one other dimension, specifically the time interval $\Delta t$, must be taken into account.

As a result of the matrix-oriented correction, in this manner, more frequent corrections can be achieved than one per repetition period. This is advantageous particularly for tests with few repetition periods.

In principle, a mixture of the file-oriented correction and a matrix-oriented correction is also possible.

A test time shortening can also be very important. This is basically possible by way of an increased testing frequency.

By means of the above-described process, the desired values are distorted in the load direction such that, at the load reversal points in each channel, the correct actual values occur which correspond to the original desired value. The phase relation between the channels is maintained because, also in the direction of the time axis, a distortion of the desired value is applied such that in each case the correct time relationship of the slave channel exists for the above-mentioned master channel. This will occur with a sufficient precision if care is taken that the reversal points of the slave channels which fall into a time interval $\Delta t$ of the master channel occur in the same percentage of the point in time in this time interval. By means of this approach, a time-related tightening of the desired value indication can also be achieved in that the time period $\Delta t$ of the master channel is shortened. The points in time at which the reversal points occur in the slave channels must then naturally also be correspondingly tightened with respect to time so that with respect to the percentage they occur at the same point in time as in the original load sequence.

However, this is permissible only provided the load is achieved with a sufficient precision (which is adjustable during the parametering) in the master channel in the reversal point after the considered time period $\Delta t$. Simultaneously, all reversal points of the slave channels which fall into this and the next time period $\Delta t$ must have been reached with a sufficient precision in the last repetition period. Only then can such a time-related tightening take place in the subsequent repetition period. The tightening (frequency increase) should take place during the parametering of the test in predeterminable step sizes ($\Delta t$ is reduced by a certain percentage).

By means of the same measure, an increase in the precision of the test loads can also be achieved. If a reversal point with the original $\Delta t$, which is provided for this half-load cycle in the desired value, can also not be reached by means of corrections of the actual value in the load direction, corresponding to the above-described approach, a $\Delta t$ can also be extended. This may become necessary at high, very fast load changes in the desired load-time history.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for adaptively correcting actual values during fatigue strength tests, the process comprising the steps of:
    separating signals which correspond to desired values and the actual values into, in each case, at least one individual event defined by two reversal points and described by:
        a first load measurement in a first reversal point;
        a second load measurement in a second reversal point;
        a time interval between said two reversal points; and
        a connection curve form between said two reversal points;
    comparing said desired values and said actual values of a mutually corresponding one of said at least one individual event;
    forming desired correction values based on said comparison step; and
    controlling said process based on said desired correction values instead of previous desired values,
    whereby said actual values are controlled in a direction of said desired correction values.

2. The process according to claim 1, wherein said time interval between the reversal points is described by points in time of said two reversal points.

3. Process according to claim 1, wherein during said comparison step, one of a difference in a load measurement and a time offset is factored into account.

4. Process according to claim 1, wherein for several load components, a desired value and an actual value are assigned to one of said several load components respectively.

5. Process according to claim 3, wherein for several load components, a desired value and an actual value are assigned to one of said several load components respectively to maintain a correct phase-relationship between the signals.

6. Process according to claim 4, wherein during the step of forming the desired correction values, the process maintains a correct phase relationship of the signals of individual channels with respect to one another.

7. Process according to claim 5, wherein during the step of forming the desired correction values, the process maintains the correct phase relationship of the signals of individual channels with respect to one another.

8. Process according to claim 1, further comprising the step of storing individual events to be assigned to the desired values in a chronologically correct sequence in a desired-value file.

9. Process according to claim 6, further comprising the step of storing individual events to be assigned to the desired values in a chronologically correct sequence in a desired value file.

10. Process according to claim 9, wherein for several channels, the storing step is performed separately for each channel.

11. Process according to claim 9, wherein for several channels, a master channel and one or several slave channels are provided.

12. Process according to claim 11, wherein the slave channels are synchronized in an alignment with the master channel.

13. Process according to claim 11, wherein that channel is defined as the master channel which has the fewest test-related reserves.

14. Process according to claim 1, wherein said connection curve form is indicated in discrete steps which are filed in a table.

15. Process according to claim 1, wherein said connection curve form is described mathematically.

16. Process according to claim 1, wherein said connection curve form is corrected via at least one support point.

17. Process according to claim 1, wherein at least one support point is inserted between the first and second reversal point, at which said at least one support point the desired value and the actual value are compared and a correction is carried out on the desired value.

18. Process according to claim 1, wherein the desired correction values are stored in a multi-dimensional matrix.

19. Process according to claim 1, wherein said time interval $\Delta t$ between the first and the second reversal point is variable.

* * * * *